(12) United States Patent
Korte

(10) Patent No.: US 12,297,052 B2
(45) Date of Patent: May 13, 2025

(54) TRANSFER DEVICE FOR AN APPARATUS FOR CONTINUOUSLY CONVEYING ITEMS, AND METHOD FOR CONTINUOUSLY CONVEYING ITEMS

(71) Applicant: ILLINOIS TOOL WORKS INC., Glenview, IL (US)

(72) Inventor: Hartmut Korte, Bramsche (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 953 days.

(21) Appl. No.: 17/428,462

(22) PCT Filed: Feb. 5, 2020

(86) PCT No.: PCT/US2020/016733
§ 371 (c)(1),
(2) Date: Aug. 4, 2021

(87) PCT Pub. No.: WO2020/163439
PCT Pub. Date: Aug. 13, 2020

(65) Prior Publication Data
US 2022/0106130 A1 Apr. 7, 2022

(30) Foreign Application Priority Data
Feb. 5, 2019 (EP) .................................... 19155445

(51) Int. Cl.
*B65G 47/51* (2006.01)
*B65G 47/68* (2006.01)

(52) U.S. Cl.
CPC ....... *B65G 47/5109* (2013.01); *B65G 47/681* (2013.01)

(58) Field of Classification Search
CPC ............... B65G 47/5109–5131; B65G 47/681
See application file for complete search history.

(56) References Cited

U.S. PATENT DOCUMENTS 4,840,265 A 6/1989 Sato et al.
9,212,008 B2 * 12/2015 Steeber ............... B65G 47/261
(Continued)

FOREIGN PATENT DOCUMENTS

AU 7722887 A 3/1988
CN 103339047 A 10/2013
(Continued)

OTHER PUBLICATIONS

European Patent Office (EPO), International Search Report, Form PCT/ISA/210 for International Application No. PCT/US2020/016733, Jun. 19, 2020 (2 pages).
(Continued)

*Primary Examiner* — Gene O Crawford
*Assistant Examiner* — Keith R Campbell
(74) *Attorney, Agent, or Firm* — Pauley Erickson & Swanson

(57) ABSTRACT

The invention relates to a transfer device (20) apparatus (100) for continuously conveying items. The apparatus (100) has a store (10) having storage tracks (11), and a downstream conveyor track (30), wherein the transfer device (20) is arranged between the store (10) and the conveyor track (30) and is designed to transfer conveyable items from a storage track (11) to the downstream conveyor track (30). The transfer device (20) has: a feed component (21) to receive conveyable items from the selected storage track (11); a discharging component (23) to discharge the conveyable items onto the downstream conveyor track (30); and a transfer track (22) to transfer the conveyable items from the feed component (21) to the discharging component (23). The discharging component (23) is designed to be moved relative to the downstream conveyor track (30) so that continuous operation is possible when the storage track (11) is being changed over.

14 Claims, 3 Drawing Sheets

(56) References Cited

U.S. PATENT DOCUMENTS

| | | | |
|---|---|---|---|
| 9,676,562 B2* | 6/2017 | Philipp | ............... B65G 47/643 |
| 2014/0001008 A1 | 1/2014 | Steeber | |
| 2024/0067462 A1* | 2/2024 | Priero | ............... B65G 47/5127 |

FOREIGN PATENT DOCUMENTS

| | | | |
|---|---|---|---|
| CN | 104797514 A | | 7/2015 |
| CN | 106 629 092 A | | 5/2017 |
| JP | H07 267351 A | | 10/1995 |
| WO | WO 2010052737 A2 | | 5/2010 |

OTHER PUBLICATIONS

European Patent Office (EPO), Written Opinion of the International Searching Authority for Int'l Appln No. PCT/US2020/016733, Form PCT/ISA/237, Jun. 19, 2020 (8 pages).

* cited by examiner

TRANSFER DEVICE FOR AN APPARATUS FOR CONTINUOUSLY CONVEYING ITEMS, AND METHOD FOR CONTINUOUSLY CONVEYING ITEMS

CROSS REFERENCE TO RELATED APPLICATION

This application is a National Phase filing of PCT International Patent Application PCT/US2020/016733, filed on 5 Feb. 2020, which claims the priority of European Patent Applications EP 19 155 455.0, filed 5 Feb. 2019.

These applications are hereby incorporated by reference herein in their entirety and is made a part hereof, including but not limited to those portions which specifically appear hereinafter.

SUMMARY OF THE INVENTION

The invention relates to a transfer device for an apparatus for continuously conveying items and a method for continuously conveying items.

Production lines or manufacturing lines with a plurality of processing stations or machines connected to one another by means of material flow systems based on the line principle have buffering sections or stores integrated into them in order to compensate for timing differences, setup times, or brief breakdowns in components of the line. These stores thus ensure that the production line is able to compensate for shorter interruptions without a production stoppage or production slowdown.

In this case, it is necessary to feed the conveyable items, which are stored in the store, from the store to a feed system of the downstream processing station in the material flow.

Often, these stores are embodied with a plurality of storage tracks, with the possibility and sometimes necessity of performing changeovers between the storage tracks during the production process. The changeover of the storage tracks in this case takes time so that a larger gap is produced between items to be transported (conveyable items) of a preceding storage track and a subsequent storage track and a continuous conveying operation is no longer possible.

This results in the fact that a subsequent processing station or machine comes to a standstill for corresponding interval, which makes the production process inefficient. There are also processing stations, which are embodied so that they are unable to cope with such a gap in the supply of the conveyable items to be processed or have only a poor ability to do so. Correspondingly, the production or manufacturing processes are interrupted and production efficiency falls.

The object of the invention, therefore, is to disclose a transfer device for an apparatus for continuously conveying items, which eliminates the above-mentioned problems and disadvantages of the prior art. In particular, the object of the invention is to disclose a transfer device in which the continuous conveying of items is assured such that the production process can function without interruption.

Another object of the invention is to disclose a method for continuously conveying items that likewise eliminates the above-mentioned problems and disadvantages of the prior art.

The object according to the invention is attained by disclosing a transfer device for an apparatus for continuously conveying items, wherein the apparatus has a store having at least a plurality, preferably a multiplicity, of storage tracks, in which conveyable items are arranged, and also has a downstream conveyor track to a downstream device, wherein the transfer device is arranged between the store and the downstream conveyor track and is designed to transfer conveyable items from a selected storage track of the store to the downstream conveyor track, wherein the transfer device has the following: a feed component, which is designed to receive conveyable items from the selected storage track; a discharging component, which is designed to discharge the conveyable items onto the downstream conveyor track; and a transfer track, which is designed to transfer the conveyable items from the feed component to the discharging component, wherein the discharging component is designed such that it can be moved relative to the downstream conveyor track in such a manner that a continuous conveying operation is possible even when the selected storage track is being changed over.

The object is attained in a satisfactory way with the transfer device according to the invention.

With the transfer device, it is particularly possible to react to a changeover of the selected storage track in such a way that on the downstream conveyor track, a continuous conveying operation is possible, i.e. a conveying operation in which the gaps or spacing distances between conveyable items are at least essentially constant.

Preferably, the storage tracks are arranged extending parallel to one another. Preferably, each storage track has an outlet via which the conveyable items can be conveyed out of the store. In this connection, the "selected storage track" is understood to be the storage track of the store from which conveyable items are received by the feed component.

The changeover of the storage track results in the fact that a larger gap is produced between the conveyed items of a previously selected storage track and the conveyed items of a subsequently selected storage track. Because of this larger gap, the continuous conveying operation is initially interrupted.

This gap, which is produced in the changeover of the storage track, is compensated for by means of the movement of the discharging component. In this case, this occurs particularly in that the discharging component is able to move or can travel along the downstream conveyor track in order to compensate for the gap.

The "feed component" and "discharging component" are generally understood to be a front end and rear end, respectively, of the transfer device.

For example, the downstream conveyor track is a feed conveyor of a downstream machine.

According to an advantageous modification of the invention, during the continuous conveying operation, the distance between conveyable items on the downstream conveyor track is at least essentially constant.

In this context, a small deviation in the distance between conveyable items in the conveying process, which cannot be prevented or which is necessary, will still be viewed as essentially constant.

The term "continuous conveying operation" will therefore be understood to mean a uniform conveying with at least essentially constant gaps. The continuous conveying operation therefore ensures that all incoming items have at least essentially the same distance from one another so that it is also possible to use downstream machines that function optimally only with uniform distances of the items from one another.

Naturally, however, the distance between the conveyable items can be changed or adjusted so that it can be adapted to the timing of the downstream machine.

According to an advantageous modification of the invention, the feed component is designed so that when the selected storage track is being changed over, the feed component moves from a previously selected storage track to a subsequently selected storage track.

In particular, the feed component moves between ends or outlets of the storage tracks oriented toward it and can thus change over from an arbitrary first storage track to an arbitrary second storage track and can subsequently be changed again. In this case, the feed component can be driven by a motor.

The changeover of the storage track can, for example, be necessary for the following reason. In the selected storage track, i.e. the storage track from which conveyable items are currently being received, there are no conveyable items or only a few of them are left, thus necessitating a changeover to another storage track that is filled with conveyable items.

According to an advantageous modification of the invention, the discharging component is designed so that after the changeover of the selected storage track, the discharging component moves from a first position to a second position on the downstream conveyor track wherein the distance between the first position and the second position corresponds to the length of a gap (spacing distance), which has been produced by the changeover of the storage track, between a last conveyable item from a previously selected storage track and a first conveyable item from a subsequently selected storage track.

For example, when changing over from a first or previously selected storage track to a second or subsequently selected storage track, a spacing distance or gap can be produced between the items of the first storage track and items of the second storage track. For example, this spacing distance is also one meter greater (longer) than the spacing distance between any two items from the first storage track that are conveyed in succession.

It is therefore necessary to compensate for this spacing distance. This happens in that the discharging component moves one meter forward in the material flow direction of the downstream conveyor track and thus the transfer point of the conveyed items onto the downstream conveyor track is shifted forward by the amount of the enlarged spacing distance (1 meter). The transporting speed of the transfer device, or stated more precisely of the transfer track, remains constant in this case.

According to an advantageous modification of the invention, the discharging component is designed so that after moving to the second position, it moves in the direction of the first position again.

In other words, the discharging component moves back to its starting position again. In this connection, the speed is preferably high enough that the discharging component is in its starting position, i.e. the first position, (no later than) the time of the next storage track changeover.

In addition, the speed of the discharging device when traveling the distance from the second position to the first position is at least essentially constant so that a uniform spacing distance is achieved between the items conveyed on the downstream conveyor track.

According to an advantageous modification of the invention, the conveyable items consist of individually packaged goods, preferably containers.

For example, the containers can be drink containers or drink packages. In this case, the store can, for example, be positioned downstream of a filling machine of the production line and can ensure that the filling machine does not have to be switched off when problems occur in the downstream machine. The downstream machine can, for example, be a capper, a drinking straw applicator, or a machine that relates to a secondary packaging element.

According to an advantageous modification of the invention, the transfer track has a constant length.

According to an advantageous modification of the invention, the transfer device, in particular the transfer track, is designed in a flexible manner and/or is equipped with one or more articulations such that it can compensate for movement of the feed component and/or of the discharging component or such that the feed component is able to move relative to the discharging component, preferably with a constant length of the transfer track.

In this connection, the feed component moves during the changeover of the storage track and the discharging component moves to compensate for the gap that is produced by the changeover; these movements happen or can happen independently of each other with a constant length of the transfer track.

Consequently, the gap produced during the changeover of the storage track is compensated for not by changing the length or transporting speed of the transfer track, but rather by moving the discharging component and through the accompanying movement of the transfer track.

The accompanying movement of the transfer track is made possible by the fact that it is designed in a flexible manner, i.e. that it is able to move in such a way that it permits a movement of the feed component and/or the discharging component. In this connection, it is conceivable for the transfer device to have at least one articulation and thus for it to also be largely flexible in this sense.

According to an advantageous modification of the invention, the transfer track has a curved region.

The curved region can move or roll along with the movement of the feed component and/or the discharging component, for example in a way analogous to that of a drag chain, and ensures that the transfer track compensates for the relative movement between the discharging component and feed component.

According to an advantageous modification, the conveying speed or transporting speed of the transfer track is at least essentially constant.

Naturally, however, the conveying speed of the transfer track is adjustable; preferably, it is possible to select among various constant speeds. During production operation, the transfer track has essentially the same conveying speed as the downstream conveyor track and both are constant. The speed of the transfer track can be adapted to the speed of the downstream conveyor track and/or the downstream processing station. Depending on the downstream processing station, different supply speeds may be required.

According to an advantageous modification of the invention, the transfer device is integrated into a packaging line.

In this case, this is a product packaging line. All in all, each of the above-described transfer devices can be inserted and integrated into an apparatus for continuously conveying items.

The object according to the invention is also attained by disclosing a method for continuously conveying items by means of an apparatus, which has the following: a store having at least a plurality of storage tracks in which conveyable items are arranged; a downstream conveyor track to a downstream device; and a transfer device, which is arranged between the store and the downstream conveyor track and is designed to transfer conveyable items from a selected storage track of the store to the downstream conveyor track, wherein the method has the following steps:

receiving conveyable items by means of a feed component of the transfer device; transferring the conveyable items from the feed component to a discharging component by means of a transfer track; and discharging the conveyable items to the downstream conveyor track by means of the discharging component, wherein, when the selected storage track is changed over from a previously selected storage track to a subsequently selected storage track, the discharging component moves relative to the downstream conveyor track or vice versa such that continuous conveying operation is possible despite the changeover of the selected conveyor track.

The object is attained in a satisfactory way with the method for continuously conveying items according to the invention.

The aspects already mentioned and details already described in relation to the transfer device naturally apply here as well.

The difference between the method and the above-mentioned transfer device particularly lies in the fact that another variant is described for the gap compensation, i.e. for achieving the continuous conveying operation.

To compensate for the gaps produced by the changeover of the storage track, the discharging component does not absolutely have to move relative to the downstream conveyor track. Instead, the reverse principle is also possible, in which the downstream conveyor track moves relative to the discharging component.

In this connection, all that matters is that the gaps produced by the changeover of the storage track are appropriately compensated for.

According to an advantageous modification of the invention, after a changeover of the selected storage track, the discharging component moves from a first position to a second position on the downstream conveyor track, wherein the distance between the first position and the second position corresponds to the length of a gap, which has been produced by the changeover of the storage track, between a last conveyable item from a previously selected storage track and a first conveyable item from a subsequently selected storage track.

This is the compensation through movement of the transfer device that has already been discussed in connection with the transfer device.

According to an advantageous modification of the invention, during the changeover of the selected storage track, the downstream conveyor track moves from a first position to a second position, wherein the distance between the first position and the second position corresponds to the length of a gap, which has been produced by the changeover of the storage track, between a last conveyable item from a previously selected storage track and a first conveyable item from a subsequently selected storage track.

Here, the reverse principle is described, in which the downstream conveyor track and preferably along with it, the downstream machine (downstream device) moves relative to the discharging component.

According to an advantageous modification of the invention, after the movement to the second position, the discharging component (23) or the downstream conveyor track (30) moves in the direction of the first position again.

The invention will be explained in detail below based on the description of exemplary embodiments with reference to the accompanying drawings.

DETAILED DESCRIPTION OF THE PREFERRED EMBODIMENTS

Figure 1:
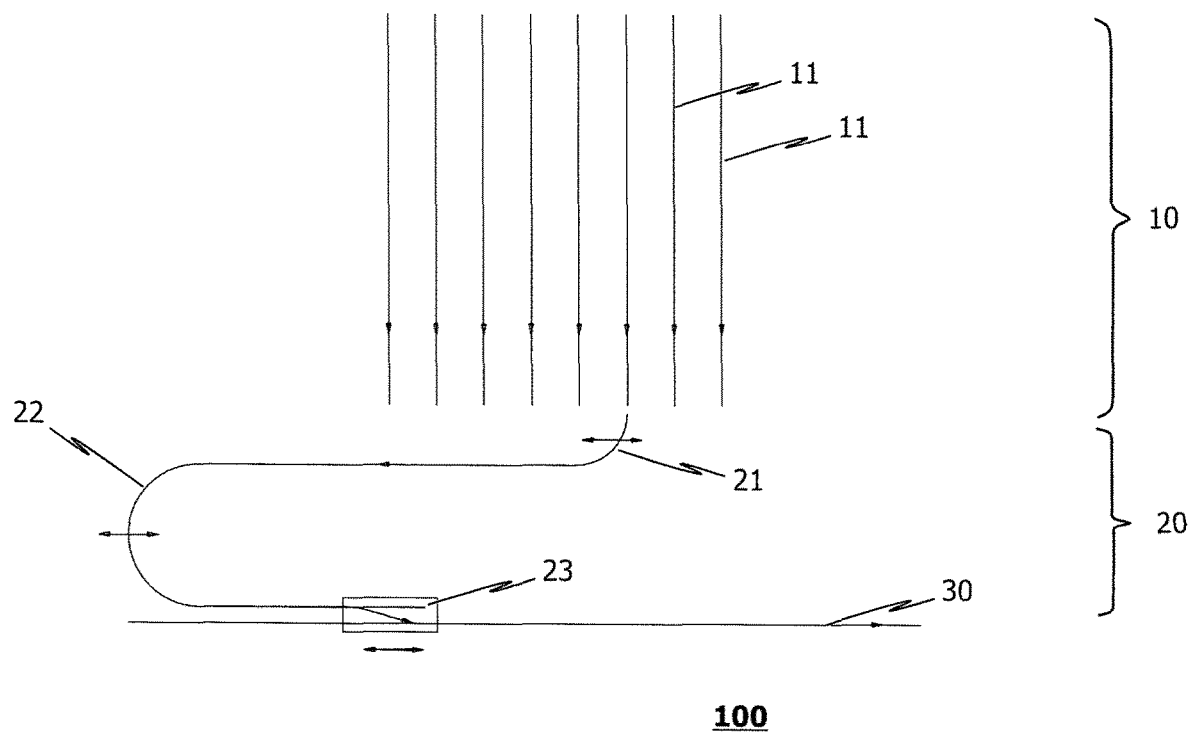
FIG. 1 shows a schematic depiction of an apparatus for continuously conveying items, having a transfer device according to one embodiment of the present invention.

FIG. 1 shows an apparatus 100 for continuously conveying items. The apparatus 100 has a store 10, a transfer device 20, and a downstream conveyor track 30.

The store 10 has a plurality of storage tracks 11. In this embodiment, the store 10 has eight storage tracks 11, for example.

The material flow through the apparatus 100 is indicated with single-pointed arrows. Consequently, the entry into the store 10 in FIG. 1 is located at an upper end and the outlet is correspondingly located at a lower end.

At the outlet of the store 10, there is a feed component 21 of the transfer device 20. The transfer device 20 fulfills the function of conveying or transferring the conveyable items stocked in the store 10 from the store 10, or stated more precisely, from the individual storage tracks 11, to the downstream conveyor track 30.

In this case, the conveyable items are received by means of the feed component 21. As is indicated by a double-headed arrow, the feed component 21 can be slid between the storage tracks 11. Stated more precisely, the feed component 21 can be slid or moved between ends of the storage tracks 11 situated toward the downstream side in the material flow.

In the state of the apparatus 100 shown in FIG. 1, the feed component 21 is positioned at the third storage track 11 from the right, i.e. this storage track 11 is currently selected; in other words, conveyable items can be received from it.

The conveyable items are conveyed along a transfer track 22 of the transfer device 20 to a discharging component 23.

The discharging component 23 transfers the conveyable items to the downstream conveyor track 30. In this case, the discharging component 23 is also embodied so that it is able to move. In particular, it is able to move relative to (and along) the downstream conveyor track 30. This is also indicated by means of a double-headed arrow in FIG. 1.

The transfer track 22 can move along with the movement of the feed component 21 and/or the discharging component 23, as is indicated by another double arrow. In other words, the transfer track 22 is flexible.

For example, if the third storage track 11 from the right in FIG. 1 is empty, then it is necessary to change over to another storage track 11. To accomplish this, the feed component 21 travels from the third storage track 11 from the right 11 to another full storage track 11 in order to be able to receive conveyable items from the latter.

During the changeover of the conveyor track 11, a gap is produced, which is larger than the spacing distance that exists between conveyed items during the rest of the process. Consequently, there is an interruption in the continuous conveying operation.

The transfer device 20 compensates for this by sliding the discharging component 23 far enough in the material flow direction of the downstream conveyor track 30, i.e. toward the right in FIG. 1, that the gap can be compensated for. A continuous conveying operation on the downstream conveyor track 30 is thus enabled once again, i.e. a conveying operation with a uniform spacing distance between the items to be conveyed.

Stated more precisely, this compensation principle of the transfer device 20 is shown in FIGS. 2a to 2e. In this case, the store 10 is shown with four storage tracks 11, for example with nine conveyable items stocked in each storage track 11.

In particular, FIGS. 2a to 2e show states of the apparatus 100 and transfer device 20 in chronological sequence (in the production process).

Figure 2A:
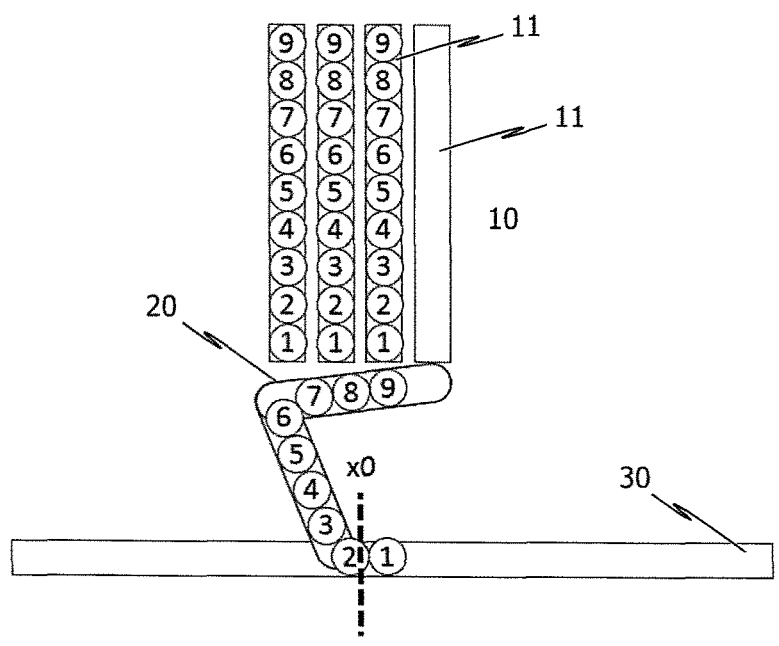
FIGS. 2a to 2e show the functional principle of the transfer device according to the present invention.

FIG. 2a shows the state of the apparatus 100 when conveying items from a first storage track 11, specifically the one on the right. In this state, the conveyable items are transferred from the discharging component 23 onto the downstream conveyor track 30 at position x0.

Figure 2B:
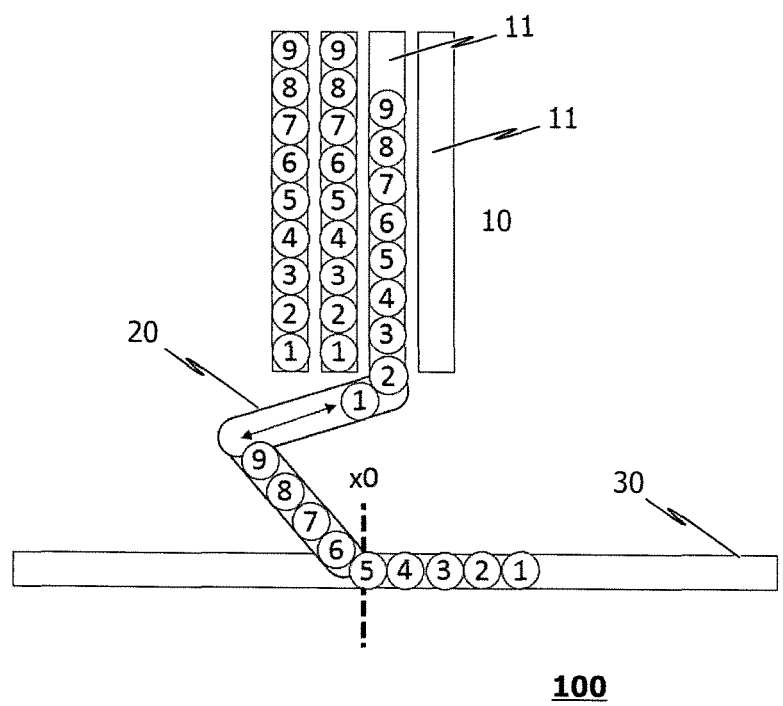

FIG. 2b shows the state after a changeover from the right storage track 11 to an adjacent storage track 11. In this case, all of the conveyable items of the right storage track 11 are already on the transfer track 22. The drawing also shows that due to the changeover, a gap has been produced between the last conveyable item 9 from the right storage track 11 and the first conveyable item 1 from the adjacent storage track 11.

This spacing distance can cause problems in the production process in the downstream machine, which is supplied by the downstream conveyor track 30.

Figure 2C:
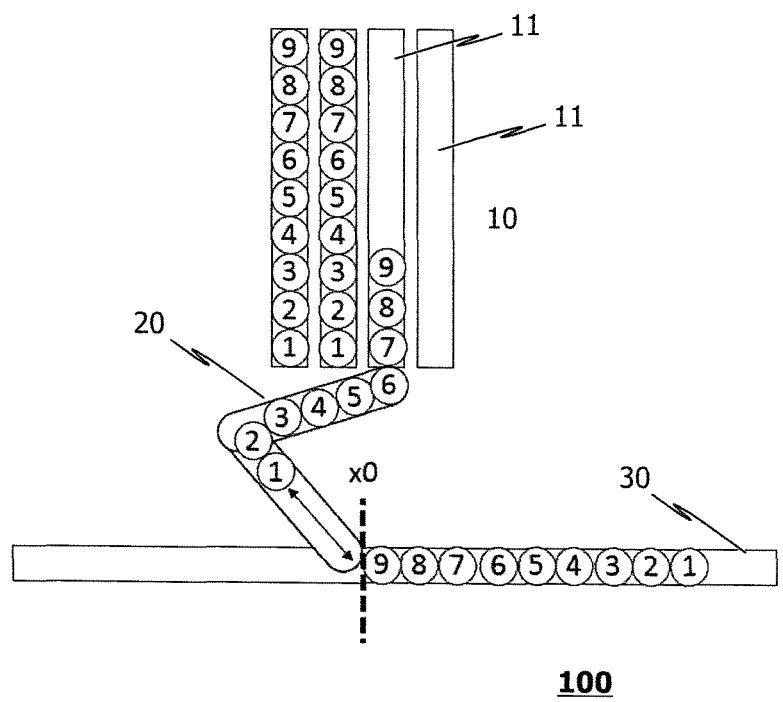

FIG. 2c shows a later state of the apparatus 100 in which all of the conveyable items (items 1-9) coming from the right storage track 11 have already been transferred to the downstream conveyor track 30.

If the discharging component 23 of the transfer device 20 were to then remain at position x0, then the next thing to happen would be that the gap would be passed on to the downstream conveyor track 30.

In order to prevent this from occurring, the discharging component 23 travels in the material flow direction of the downstream conveyor track 30, i.e. toward the right in FIGS. 2a to 2e. This increases the absolute speed of the conveyed items.

Figure 2D:
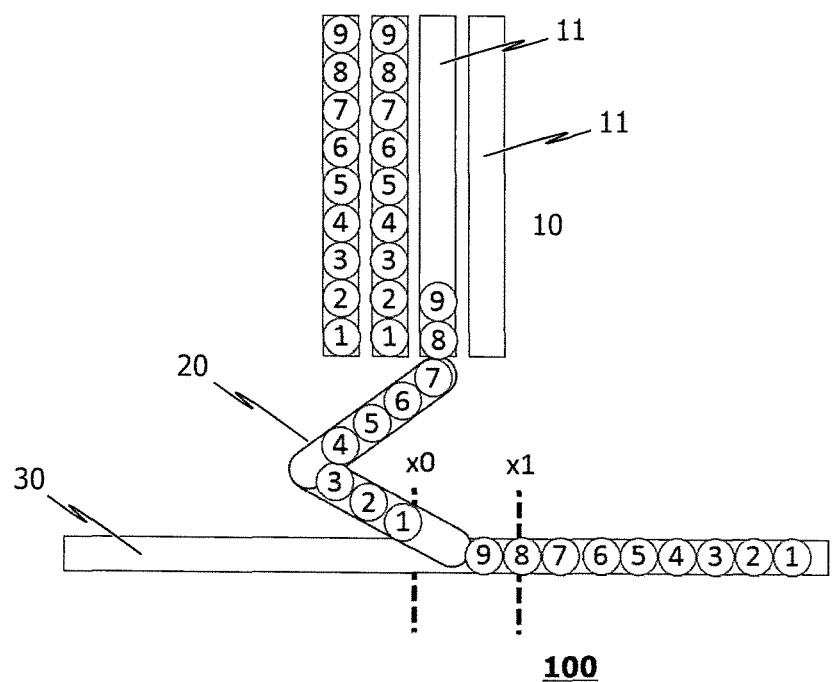

In this regard, FIG. 2d shows a state of the apparatus 100 in which the discharging component 23 has already moved in this direction to the point that approximately half of the travel distance has been traveled. The whole distance to be traveled by the discharging component 23 (distance from x0 to x1) corresponds to the spacing distance that is to be compensated for on the transfer track 22, i.e. the size of the gap between the last conveyable item 9 from the right storage track 11 and the first item 1 from the adjacent conveyor track 11.

Figure 2E:
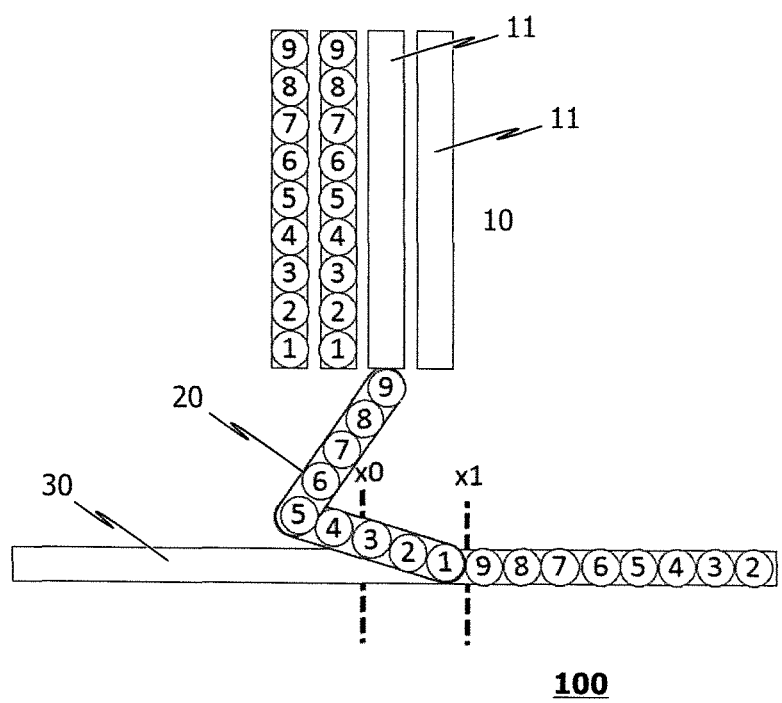

In FIG. 2e, the discharging component 23 has been moved forward to position x1 on the downstream conveyor track 30. It is clear here that the gap between the last conveyable item 9 from the right storage track 11 and the first conveyable item 1 from the adjacent storage track 11 has been fully compensated for. At this point, it is once again correspondingly possible to provide a continuous conveying operation on the downstream conveyor track 30.

In this connection, it is preferable that after reaching position x1 during the transfer of the conveyable items, the discharging component 23 is moved slowly back toward x0. This enables a repeated compensation or repeated evening-out by means of the transfer device 20.

This does indeed produce a slightly larger gap between the individual conveyable items, but the gaps are all at least essentially the same so that there is no interruption of the continuous conveying operation on the downstream conveyor track 30.

What is claimed is:

1. A transfer device (20) for an apparatus (100) for continuously conveying items, wherein the apparatus (100) has a store (10) having at least a plurality of storage tracks (11), in which conveyable items are arranged, and also has a downstream conveyor track (30) to a downstream device, wherein the transfer device (20) is arranged between the store (10) and the downstream conveyor track (30) and is designed to transfer conveyable items from a selected storage track (11) of the store (10) to the downstream conveyor track (30), the transfer device comprising:
   a feed component (21), which is designed to receive conveyable items from the selected storage track (11);
   a discharging component (23), which is configured to discharge the conveyable items onto the downstream conveyor track (30);
   a transfer track (22) configured to transfer the conveyable items from the feed component (21) to the discharging component (23);
   wherein the discharging component (23) is configured to be moveable relative to the downstream conveyor track (30) to enable continuous conveyance even when the selected storage track (11) is changed, and wherein after the changeover of the selected storage track (11), the discharging component (23) moves from a first position (x0) to a second position (x1) on the downstream conveyor track (30), wherein the distance between the first position (x0) and the second position (x1) corresponds to the length of a gap, which has been produced by the changeover of the storage track (11), between a last conveyable item (9) from a previously selected storage track (11) and a first conveyable item (1) from a subsequently selected storage track (11).

2. The transfer device (20) according to claim 1, wherein, during the continuous conveying operation, the distance between conveyable items on the downstream conveyor track (30) is at least essentially constant.

3. The transfer device (20) according to claim 1 wherein the feed component (21) is designed so that when the selected storage track (11) is being changed over, the feed component (21) moves from a previously selected storage track (11) to a subsequently selected storage track (11).

4. The transfer device (20) according to claim 1, wherein the discharging component (23) is configured so that after moving to the second position (x1), it moves in the direction of the first position (x0) again.

5. The transfer device (20) according to claim 1, wherein the conveyable items consist of individually packaged goods or containers.

6. The transfer device (20) according to claim 1, wherein the transfer track (22) has a constant length.

7. The transfer device (20) according to claim 1, wherein the transfer track (22), is configured in a flexible manner such that it can compensate for movement of the feed component (21) and/or of the discharging component (23).

8. The transfer device (20) according to claim 1, wherein the transfer track (22) has a curved region.

9. The transfer device (20) according to claim 1, wherein the conveying speed of the transfer track (22) is at least essentially constant.

10. The transfer device (20) according to claim 1, wherein the transfer device (20) is integrated into a packaging line.

11. A method for continuously conveying items by means of an apparatus (100), which includes the following:
    a store (10) having at least a plurality, preferably a multiplicity, of storage tracks (11), in which conveyable items are arranged;
    a downstream conveyor track (30) to a downstream device; and a transfer device (20), which is arranged between the store (10) and the downstream conveyor track (30) and is designed to transfer conveyable items from a selected storage track (11) of the store (10) to the downstream conveyor track (30), wherein the method includes the following steps:

receiving conveyable items by means of a feed component (21) of the transfer device (20);

transferring the conveyable items from the feed component (21) to a discharging component (23) by means of a transfer track (22); and discharging the conveyable items to the downstream conveyor track (30) by means of the discharging component (23), wherein, when the selected storage track (11) is changed over from a previously selected storage track (11) to a subsequently selected storage track (11), the discharging component (23) moves relative to the downstream conveyor track (30) or vice versa such that continuous conveying operation is possible despite the changeover of the selected conveyor track (11), wherein after a changeover of the selected storage track (11), the discharging component (23) moves from a first position (x0) to a second position (x1) on the downstream conveyor track (30), wherein the distance between the first position (x0) and the second position (x1) corresponds to the length of a gap, which has been produced by the changeover of the storage track (11), between a last conveyable item (9) from a previously selected storage track (11) and a first conveyable item (1) from a subsequently selected storage track (11).

12. A method for continuously conveying items by means of an apparatus (100), which includes the following:

a store (10) having at least a plurality, preferably a multiplicity, of storage tracks (11), in which conveyable items are arranged;

a downstream conveyor track (30) to a downstream device; and a transfer device (20), which is arranged between the store (10) and the downstream conveyor track (30) and is designed to transfer conveyable items from a selected storage track (11) of the store (10) to the downstream conveyor track (30), wherein the method includes the following steps:

receiving conveyable items by means of a feed component (21) of the transfer device (20);

transferring the conveyable items from the feed component (21) to a discharging component (23) by means of a transfer track (22); and discharging the conveyable items to the downstream conveyor track (30) by means of the discharging component (23), wherein, when the selected storage track (11) is changed over from a previously selected storage track (11) to a subsequently selected storage track (11), the discharging component (23) moves relative to the downstream conveyor track (30) or vice versa such that continuous conveying operation is possible despite the changeover of the selected conveyor track (11), wherein after a changeover of the selected storage track (11), the downstream conveyor track (30) moves from a first position to a second position, wherein the distance between the first position and the second position corresponds to the length of a gap, which has been produced by the changeover of the storage track (11), between a last conveyable item (9) from a previously selected storage track (11) and a first conveyable item (1) from a subsequently selected storage track (11).

13. The method for continuously conveying items according to claim 11, wherein after the movement to the second position, the discharging component (23) moves in the direction of the first position again.

14. The method for continuously conveying items according to claim 11, wherein after the movement to the second position, the downstream conveyor track (30) moves in the direction of the first position again.

* * * * *